United States Patent Office 3,316,232
Patented Apr. 25, 1967

3,316,232
POLYPROPYLENE COMPOSITIONS AND A METHOD FOR THEIR PREPARATION
James F. McGann, Jr., Hopkins, Minn., assignor to Atlas Chemical Industries, Inc., a corporation of Delaware
No Drawing. Filed Feb. 24, 1961, Ser. No. 91,313
5 Claims. (Cl. 260—93.7)

This invention relates to polypropylene compositions and their method of preparation. In particular, this invention relates to polypropylene compositions having a reduced tendency to accumulate electrostatic charges and to a method for preparing polypropylene compositions containing a compatible antistatic agent.

Polypropylene has many useful properties which have contributed to its recently acquired importance as a commercial plastic material. One such property is polypropylene's very poor electrical conductivity which makes it useful as an insulating material. In addition, this property of poor electrical conductivity has the disadvantage of causing polypropylene to accumulate electrostatic charges during manufacture, treatment and use. The accumulated electrostatic charges are troublesome in that they make the articles more difficult to handle during manufacture and treatment and they increase the tendency of the finished articles to accumulate dust.

It is an object of this invention to provide a polypropylene composition having a reduced tendency to accumulate electrostatic charges.

Another object is to provide a polypropylene composition containing a compatible antistatic agent.

A further object is to provide a method for preparing polypropylene compositions in which an antistatic agent is incorporated in melted polypropylene, resulting in protecting the surface of the finished polypropylene article against electrostatic charge accumulation.

Other objects and purposes of this invention will be obvious to those skilled in the art in view of the description which follows.

It has been discovered that the tendency for polypropylene compositions to accumulate electrostatic charges can be reduced by incorporating a compatible antistatic agent in the polypropylene composition. The antistatic agent which is incorporated in polypropylene in accordance with this invention is 1-hydroxyethyl-2-alkyl imidazoline represented by the following formula:

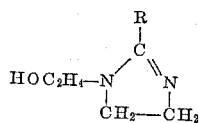

in which R is an aliphatic group containing from 10 to 20 carbon atoms. The substituted imidazolines of this type are viscous liquids or waxy solids at ordinary temperatures. The preferred antistatic agent of this invention is 1-hydroxyethyl-2-heptadecenyl imidazoline.

The substituted imidazoline antistatic agent may be incorporated into polypropylene or applied to the surface of polypropylene in amounts ranging from 0.001 to 5.0% by weight, with a preferred range of 0.1 to 3.0% by weight. If the antistatic agent is present in amounts less than 0.001 weight percent there is only a slight reduction in the tendency to accumulate electrostatic charges, and using amounts over 5.0% by weight adds greatly to the cost of the polypropylene composition while effecting only slight improvement per amount of agent over 5.0% by weight.

This invention is generally applicable to polypropylenes of different molecular weights and melting points, and especially to those polypropylenes which are presently commercially available. The best results are obtained with polypropylene compositions which are normally solid. The polypropylene may be modified by the addition of agents other than the antistatic agent, such as natural and artificial plastics, wax, gums, resins, dyes, pigments, antioxidants, and/or fillers.

It has also been found that the substituted imidazoline antistatic agents may be incorporated into polypropylene by melting the polypropylene and then directly adding the substituted imidazoline to the melt while concurrently agitating the melt to disperse the substituted imidazoline uniformly throughout the melt. The polypropylene-antistatic agent composition may then be melt spun to form polypropylene yarn, injection molded into articles, rolled into sheets, extruded into tubes or subjected to some other type of operation. Upon cooling the formed polypropylene composition, the substituted imidazoline exudes to the surface of the polypropylene article, thereby removing electrostatic charges which accumulate on the surface of the article.

Polypropylene articles prepared in accordance with this invention acquire little or no electrostatic charge after having been subjected to prolonged friction because of the increased conductivity of the polypropylene composition. In addition, any electrostatic charge which may accumulate on the polypropylene article will be rapidly dissipated.

In addition to incorporating the substituted imidazoline antistatic agent into a polypropylene melt, the antistatic agent may also be applied directly to the surface of the polypropylene article. Any of the numerous conventional methods for applying coatings may be used in applying the substituted imidazoline, such as spraying, painting or dipping in an aqueous or organic solvent dispersion of the substituted imidazoline. The substituted imidazolines used in this invention are not readily dispersed in water, therefore, when the substituted imidazoline is applied from an aqueous solution, it may be necessary to add an emulsifier or an acid to the aqueous solution to help disperse the substituted imidazoline. The preferred method is the incorporation of the substituted imidazoline in a polypropylene melt for this is such an easy and convenient method for getting a good, uniform coating of antistatic agent on polypropylene.

The following examples illustrate specific embodiments of compositions and the method of this invention.

EXAMPLE I 50.0 lbs. of commercial polypropylene is melted and 1.25 lbs. of 1-hydroxyethyl-2-heptadecenyl imidazoline is added to the melt with stirring. This mixure is melt spun to form polypropylene yarn. A sample of this treated polypropylene yarn and a sample of untreated polypropylene yarn may be rubbed under light tension over a smooth steel rod in order to develop an electrostatic charge on the yarn. Measurement of accumulated electrostatic charge shows that yarn treated in accordance with this invention accumulates much less electrostatic charge than untreated yarn. It has been found that the 1-hydroxyethyl-2-heptadecenyl imidazoline exudes to the surface of the treated polypropylene yarn during cooling of the yarn.

EXAMPLE II 50.0 lbs. of commercial polypropylene is melted and 0.05 lb. of 1-hydroxyethyl-2-dodecyl imidazoline is added to the melt. This mixture is then rolled into sheets and a length of polypropylene film, e.g. 6 inches wide and 0.001 inch thick, may be cut from one of the sheets. This treated film is then compared to untreated polypropylene film for accumulation of electrostatic charge, and it is found that the untreated film accumulates significantly more electrostatic charge than the treated film.

EXAMPLE III 50.0 lbs. of commercial polypropylene is melted and 0.005 lb. of 1-hydroxyethyl-2-heptadecyl imidazoline is added to the melted polypropylene. This mixture is melt spun to form polypropylene yarn which is compared to untreated polypropylene yarn for the accumulation of electrostatic charge. The treated yarn accumulates significantly less elecrostatic charge than the untreated yarn.

EXAMPLE IV

An extruded tube prepared from commercial polypropylene is immersed in an aqueous solution containing 1.0% by weight of 1-hydroxyethyl-2-hepadecenyl imidazoline and also containing about 1.0% by weight of an emulsifier, sorbitan monooleate, to help disperse the 1-hydroxyethyl-2-heptadecenyl imidazoline in the water. After immersion in the aqueous solution for 5 minutes, the tube is removed and air dried. Thereafter, the treated tube is compared to an untreated polypropylene tube, and it is found that the treated tube builds up significantly less electrostatic charge than the untreated tube.

Having completely described this invention, what is claimed is:

1. A composition of matter comprising polypropylene and from about 0.001 to about 5% by weight of 1-hydroxyethyl-2-heptadecenyl imidazoline.
2. The composition of claim 1 in which the 1-hydroxyethyl-2-heptadecenyl imidazoline is present in amounts ranging from about 0.1 to about 3% by weight.
3. Polypropylene yarn which has been melt spun from the composition of claim 1.
4. A method for preparing polypropylene compositions which have a reduced tendency to accumulate electrostatic charges which comprises melting polypropylene, adding with agitation from about 0.001 to about 5% by weight of 1-hydroxyethyl-2-heptadecenyl imidazoline, shaping the melted mixture, and then cooling the shaped polypropylene.
5. The method of claim 4 in which the shaping operation is melt spinning to form polypropylene yarn.

References Cited by the Examiner
UNITED STATES PATENTS

| | | | |
|---|---|---|---|
| 2,969,337 | 1/1961 | Goodwin et al. | 260—45.9 |
| 2,987,521 | 6/1961 | Hughes et al. | 260—309.6 |
| 2,992,205 | 7/1961 | Broyles et al. | 260—309.6 |

JOSEPH L. SCHOFER, *Primary Examiner.*

M. STERMAN, A. SULLIVAN, L. EDELMAN, T. D. KERWIN, R. W. GRIFFIN, *Assistant Examiners.*